US010107833B2

(12) United States Patent
Sakai (10) Patent No.: US 10,107,833 B2
(45) Date of Patent: Oct. 23, 2018

(54) ATOMIC FORCE MICROSCOPE AND CONTROL METHOD OF THE SAME

(71) Applicant: OLYMPUS CORPORATION, Tokyo (JP)

(72) Inventor: Nobuaki Sakai, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/863,023

(22) Filed: Jan. 5, 2018

(65) Prior Publication Data

US 2018/0143220 A1 May 24, 2018

Related U.S. Application Data

(63) Continuation of application No. PCT/JP2015/069552, filed on Jul. 7, 2015.

(51) Int. Cl.
*G01Q 10/06* (2010.01)
*G01Q 60/24* (2010.01)

(52) U.S. Cl.
CPC .......... *G01Q 10/065* (2013.01); *G01Q 60/24* (2013.01)

(58) Field of Classification Search
USPC ...................................................... 850/33, 36
See application file for complete search history.

(56) References Cited

U.S. PATENT DOCUMENTS

| 7,947,952 B1* | 5/2011 | Kley | ...................... | G01Q 30/04 |
| | | | | 250/234 |
| 2009/0032706 A1 | 2/2009 | Prater et al. | | |
| 2017/0261532 A1* | 9/2017 | Pieper | .................... | G01Q 60/24 |

FOREIGN PATENT DOCUMENTS

| JP | 4083517 B2 | 4/2008 |
| JP | 5079109 B2 | 11/2012 |

OTHER PUBLICATIONS

English translation of International Preliminary Report on Patentability dated Jan. 18, 2018 together with the Written Opinion received in related International Application No. PCT/JP2015/069552.
International Search Report dated Oct. 6, 2015 issued in PCT/JP2015/069552.
Ando, T, "High-Speed Imaging Apparatus for Viewing Nanometer-Scale Dynamics of Protein", Journal of the Japan Society of Precision Engineering, 2006, vol. 72, No. 11, The Japan Society for Precision Engineering, pp. 1315-1318.

* cited by examiner

*Primary Examiner* — Kiet T Nguyen
(74) *Attorney, Agent, or Firm* — Scully, Scott, Murphy & Presser, P.C.

(57) ABSTRACT

An atomic force microscope is to acquire sample information by a raster scanning of a cantilever with respect to a sample. The atomic force microscope includes a raster-scanning-information generator to generate raster scanning information including timing information. The timing information includes a first timing at which a relative speed between the cantilever and sample decreases lower than a threshold, and a second timing at which the relative speed increases higher than the threshold after the first timing. The atomic force microscope also includes a raster-scanning controller to control the raster scanning, and an interaction controller to decrease the strength of an interaction between the cantilever and sample at the first timing, and increase the strength of the interaction at the second timing.

12 Claims, 6 Drawing Sheets

ATOMIC FORCE MICROSCOPE AND CONTROL METHOD OF THE SAME

CROSS REFERENCE TO RELATED APPLICATIONS

This application is a Continuation Application of PCT Application No. PCT/JP2015/069552, filed Jul. 7, 2015, the entire contents of which are incorporated herein by reference.

BACKGROUND OF THE INVENTION

1. Field of the Invention

The present invention relates to scanning probe microscopes, in particular, atomic force microscopes for use in observation of living body samples.

2. Description of the Related Art

The scanning probe microscope (SPM) is a scanning microscope that mechanically scans a mechanical probe to acquire information on a sample surface, and is a common name for a scanning tunneling microscope (STM), an atomic force microscope (AFM), a scanning magnetic force microscope (MFM), a scanning capacitance microscope (SCaM), a scanning near-field optical microscope (SNOM), and the like.

The scanning type probe microscope acquires desired surface information on the sample through the mechanical probe while raster scanning a mechanical probe and a sample relatively in X- and Y-directions to map and display the information on a display. Of these, the atomic force microscope (hereinafter, referred to as AFM), which is the most widely used device, comprises a cantilever having a mechanical probe at its free end, an optical displacement sensor to detect a displacement of the cantilever, and a scanner to relatively scan the cantilever and a sample. The AFM causes a mechanical interaction to be generated between the mechanical probe and the sample to acquire information on the sample based on deformation of the cantilever caused by the mechanical interaction.

Recently, a soft matter observation AFM to observe, in a liquid, soft samples such as a biological sample and a gel is receiving attention. In a soft matter observation AFM, how small an influence on a sample can be reduced, specifically, how small deformation of the sample resulting from a mechanical interaction acting between a mechanical probe and the sample can be decreased, is important. In a conventional soft matter observation AFM, as shown in, for example, Japanese Patent No. 4083517, reduction of the interaction is aimed by contriving closed loop control for keeping a distance between a cantilever and a sample constant.

BRIEF SUMMARY OF THE INVENTION

The present invention is directed to an atomic force microscope to acquire sample information by a raster scanning of a cantilever with respect to a sample in combination of scanning in Y-direction and scanning in X-direction faster than the scanning in Y-direction. The atomic force microscope includes a raster-scanning-information generator to generate raster scanning information including timing information synchronized with the scanning in the X-direction, the timing information including a first timing at which a relative speed between the cantilever and the sample decreases lower than a predetermined threshold, and a second timing at which the relative speed increases higher than the predetermined threshold after the first timing, a raster-scanning controller to control the raster scanning based on the raster scanning information, and an interaction controller to, based on the timing information, relatively decrease the strength of an interaction between a probe provided at a free end of the cantilever and the sample at the first timing, and relatively increase the strength of the interaction at the second timing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

In soft samples such as a gel, there is a tendency in that deformation of the sample becomes larger as the time during which the interaction between a probe and the sample acts becomes longer. For this reason, when the raster scanning is stopped with leaving the interaction generated, a problem that the probe sticks deep into a soft sample, such as a gel, occurs. This is a significant problem in soft matter observation AFMs to observe soft samples such as a gel.

A first embodiment solves this problem, and the first embodiment will be explained below using FIG. 1.

Figure 1:
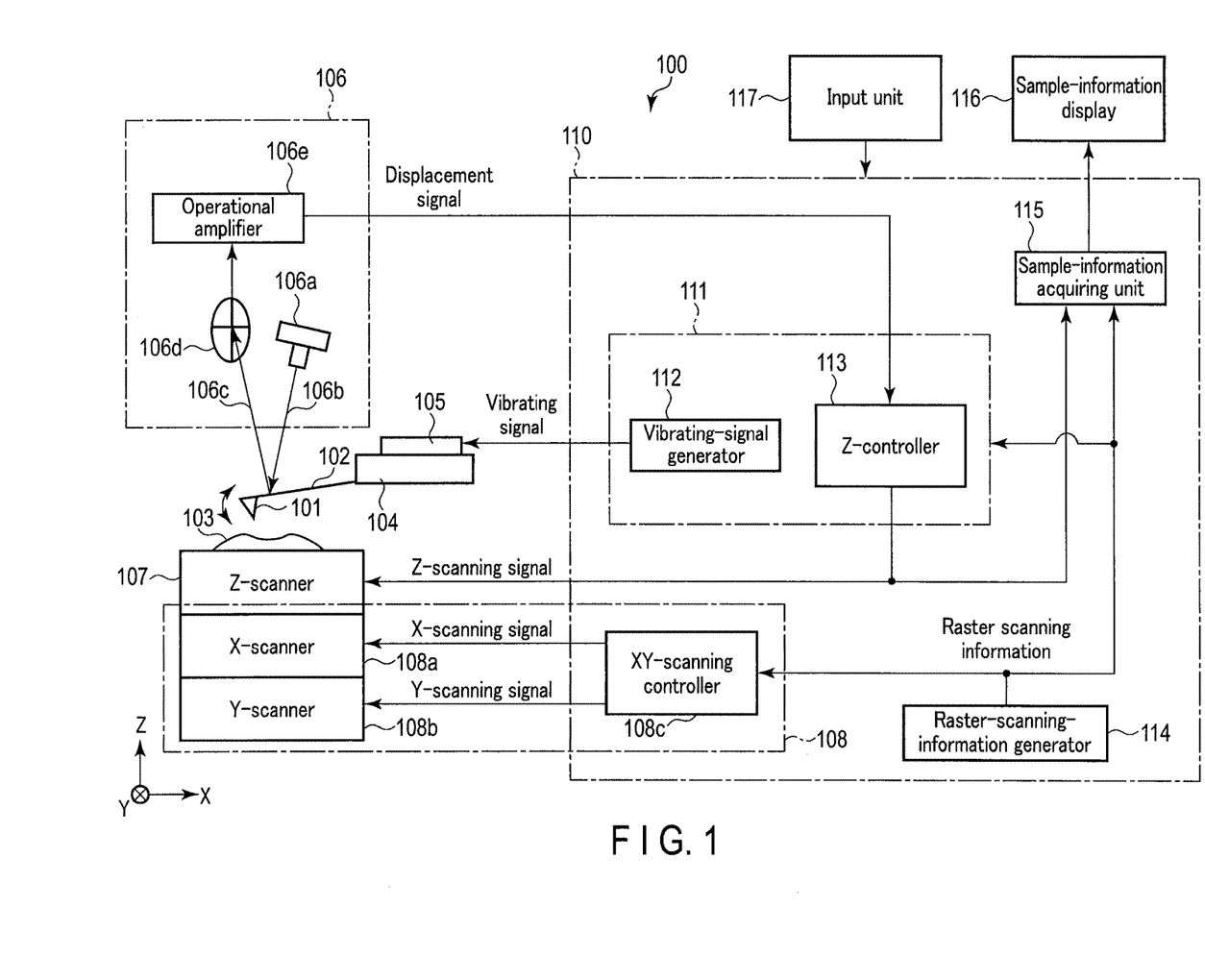
FIG. 1 shows an atomic force microscope of a first embodiment.

FIG. 1 shows an atomic force microscope 100 of the present embodiment. The atomic force microscope 100 includes a cantilever 102 having a probe 101 at the free end. This cantilever 102 is held by a holder 104, and the probe 101 is placed so as to face a sample 103. The sample 103 is held on a Z-scanner 107 through an unillustrated sample stage.

Above the cantilever 102, an optical lever sensor 106 for optically detecting a displacement of the cantilever 102 is placed. The optical lever sensor 106 comprises a laser-light source 106a to apply laser light 106b on a back surface of the cantilever 102, a multi-segment detector 106d to receive laser light 106c reflected from the back surface of the cantilever 102, and an operational amplifier 106e to calculate a displacement signal of the cantilever 102 based on an output signal of the multi-segment detector 106d and to output the displacement signal. The displacement signal of the cantilever 102 output from the operational amplifier 106e includes an alternate signal reflecting an oscillation of the cantilever described below. The displacement signal of the cantilever 102 is supplied to a Z-controller 113.

A piezoelectric element 105 is provided on the holder 104. The piezoelectric element 105 operates as an oscillator to oscillate the cantilever 102 through the holder 104. The piezoelectric element 105, which is controlled by an oscillating-signal generator 112, oscillates the cantilever 102 based on an oscillating signal output from the oscillating-signal generator 112. That is, the oscillation of the cantilever 102 is controlled by the oscillating-signal generator 112.

A Z-scanner 107 is to scan the sample 103 along a Z-direction with respect to the cantilever 102. The Z-scanner 107 is mounted on an X-scanner 108a, which is mounted on a Y-scanner 108b. The Z-scanner 107 is controlled by the Z-controller 113. Specifically, the Z-controller 113 receives the displacement signal including the alternate signal reflecting the oscillation of the cantilever 102, to generate a Z-scanning signal for keeping, for example, an amplitude value of the displacement signal constant, causing the Z-scanner 107 to expand and contract along the Z-direction based on the Z-scanning signal, so as to scan the sample 103 along the Z-direction with respect to the cantilever 102. That is, a relative distance between the cantilever 102 and the sample 103 along the Z-direction is controlled by the Z-controller 113. The Z-scanning signal generated by the Z-controller 113 is supplied also to a sample-information acquiring unit 115.

A raster-scanning controller 108 comprises an X-scanner 108a, a Y-scanner 108b, and an XY-scanning controller 108c.

The X-scanner 108a and the Y-scanner 108b are to raster scan the sample 103 across an XY-plane with respect to the cantilever 102. The X-scanner 108a and the Y-scanner 108b are controlled by the XY-scanning controller 108c. The X-scanner 108a and the Y-scanner 108b are displaced along the X-direction and a Y-direction based on the X-scanning signal and a Y-scanning signal output from the XY-scanning controller 108c, respectively, so as to raster scan the sample 103 across the XY-plane with respect to the cantilever 102.

A controller 110 includes an interaction controller 111, the XY-scanning controller 108c, a raster-scanning-information generator 114, and the sample-information acquiring unit 115.

The raster-scanning-information generator 114 generates raster scanning information necessary for desired raster scanning. The raster scanning information is supplied to the XY-scanning controller 108c, the interaction controller 111, and the sample-information acquiring unit 115. The raster scanning information includes information related to a stop of the raster scanning, when stopping the raster scanning.

The XY-scanning controller 108c generates an X-scanning signal and a Y-scanning signal based on the raster scanning information. Therefore, the raster scanning is controlled by the raster-scanning controller 108 comprising the X-scanner 108a, Y-scanner 108b, and XY-scanning controller 108c, based on the raster scanning information.

The interaction controller 111 comprises the oscillating-signal generator 112, and the Z-controller 113. Therefore, the piezoelectric element 105 is controllable by the interaction controller 111 comprising the oscillating-signal generator 112. That is, the interaction controller 111 can control the oscillation of the cantilever 102. The Z-scanner 107 also is controllable by the interaction controller 111 comprising the X-controller 113. That is, the interaction controller 111 can control a relative distance between the cantilever 102 and the sample 103 along the Z-direction. The interaction controller 111 changes, for example, amplitude of the oscillation of the cantilever 102, or a relative distance between the cantilever 102 and the sample 103 along the Z-direction, based on the raster-scanning information.

For example, if the amplitude of the oscillation of the cantilever 102 changes, or the relative distance between the cantilever 102 and the sample 103 along the Z-direction changes, the strength of a mechanical interaction between the probe 101 and the sample 103 relatively changes. Specifically, if the amplitude of the oscillation of the cantilever 102 increases, the strength of the mechanical interaction between the probe 101 and the sample 103 relatively increases, and if the amplitude of the oscillation of the cantilever 102 decreases, the strength of the mechanical interaction between the probe 101 and the sample 103 relatively decreases. If the relative distance between the cantilever 102 and the sample 103 along the Z-direction increases, the strength of the mechanical interaction between the probe 101 and the sample 103 relatively decreases, and if the relative distance between the cantilever 102 and the sample 103 along the Z-direction decreases, the strength of the mechanical interaction between the probe 101 and the sample 103 relatively increases.

In this way, the interaction controller 111 can control the strength of the mechanical interaction between the probe 101 and the sample 103 based on the relative speed information. Concretely, the interaction controller 111 relatively decreases the strength of the mechanical interaction between the probe 101 and the sample 103 if the relative speed information indicates a relative decrease in relative speed, and relatively increases the strength of the mechanical interaction between the probe 101 and the sample 103 if the relative speed information indicates a relative increase in relative speed.

The sample-information acquiring unit 115 obtains sample information, for example, surface shape information, to generate image data for mapping obtained surface information, based on the Z-scanning signal and the raster scanning information supplied.

A sample-information display 116 displays the image data generated by the sample-information acquiring unit 115.

An input unit 117 is connected to the controller 110. The input unit 117 is for installing, in the controller 110, for example, a program of the controlling method disclosed herein, designating an observation area, and giving a command such as a start of observation and an end of observation to the controller 110.

Next, a flow of operations of the atomic force microscope thus configured will be explained.

The oscillating-signal generator 112 outputs an oscillating signal, to supply the oscillating signal to the piezoelectric element 105, which operates as the oscillator.

The piezoelectric element 105 oscillates the cantilever 102 near its mechanical resonance frequency, based on the oscillating signal.

The optical lever sensor 106 placed above the cantilever 102 detects a displacement of the cantilever 102, to supply the displacement signal including an alternate signal reflecting the oscillation of the cantilever 102 to the Z-controller 113.

A raster-scanning-information controller 114 generates raster scanning information necessary for desired raster scanning. The raster scanning information is supplied to the XY-scanning controller 108c, the interaction controller 111, and the sample-information acquiring unit 115. The raster scanning information does not include the information related to the stop of the raster scanning.

The XY-scanning controller 108c outputs the X-scanning signal and the Y-scanning signal based on the raster scanning information.

The X-scanner 108a and Y-scanner 108b respectively receive the X-scanning signal and the Y-scanning signal to raster scan the sample 103 across the XY-plane with respect to the cantilever 102. At the time, the relative speed between the probe 101 and the sample 103 across the XY-plane becomes higher than zero.

Concurrently with the raster scanning, the Z-controller 113 within the interaction controller 111 receives the displacement signal including the alternate signal reflecting the oscillation of the cantilever 102, to generate the Z-scanning signal for keeping, for example, an amplitude value of the displacement signal constant, causing the Z-scanner 107 to expand and contract in the Z-direction based on the Z-scanning signal, so as to scan the sample 103 along the Z-direction with respect to the cantilever 102. The Z-scanning signal is supplied also to the sample-information acquiring unit 115.

The sample-information acquiring unit 115 obtains sample information, for example, surface shape information, to generate image data for mapping obtained surface information, based on the Z-scanning signal and the raster scanning information supplied.

The sample-information display 116 displays the image data generated by the sample-information acquiring unit 115.

When the acquisition of the sample information is finished, the raster scanning information generator 114 generates raster scanning information including scanning stop information related to the stop of the raster scanning. The raster scanning information is supplied to the XY-scanning controller 108c, the interaction controller 111, and the sample-information acquiring unit 115.

The XY-scanning controller 108c stops an output of the X-scanning signal and the Y-scanning signal based on the scanning stop information in the raster scanning information. In response to this, the X-scanner 108a and the Y-scanner 108b stop the raster scanning. That is, the raster scanning is stopped by the raster-scanning controller 108 comprising the X-scanner 108a, the Y-scanner 108b, and the XY-scanning controller 108c, based on the raster stop information in the raster scanning information.

The interaction controller 111 receives the scanning stop information in the raster scanning information, at the same time as the stop of the raster scanning, for example, to decrease the amplitude of vibration of the cantilever 102, or to increase the relative distance between the cantilever 102 and the sample 103 along the Z-direction, so as to decrease the strength of the mechanical interaction between the probe 101 and the sample 103.

The sample-information acquiring unit 115 receives the scanning stop information in the raster scanning information, to stop acquisition of sample information.

With the above configuration, in the present embodiment, at the time of stopping the raster scanning, the strength of the interaction between the probe 101 and the sample 103 is relatively decreased, for example, by decreasing the amplitude of vibration of the cantilever 102, or increasing the relative distance between the cantilever 102 and the sample 103 along the Z-direction. As a result, it prevents the problem of the probe from sticking deep into a soft sample, such as a gel, due to the stop of the raster scanning.

Second Embodiment

In a sample such as a gel, the tendency that the deformation of the sample becomes large as the time during which an interaction acts becomes long also causes another problem other than the problem explained in the first embodiment.

The problem is attributable to the raster scanning. First, the raster scanning will be explained.

In the present embodiment, the time during which the interaction works is considered as a time during which the probe passes a unit length of a sample surface across the XY-plane. The time during which the probe passes the unit length of the sample surface across the XY-plane is equal to the reciprocal of the relative speed between the probe and the sample across the XY-plane. That is, the time during which the interaction works is inversely proportional to the relative speed between the probe and the sample across the XY-plane. Therefore, a tendency that the deformation of the sample becomes larger as the time during which the interaction acts is longer may be otherwise stated as a tendency that the deformation of the sample becomes larger as the relative speed is lower. The state where the raster scanning is stopped may be otherwise stated as a state where the relative speed is zero. It should be noted that the relative speed between the probe and the sample is equal to a relative speed between the cantilever and the sample.

Figure 2:
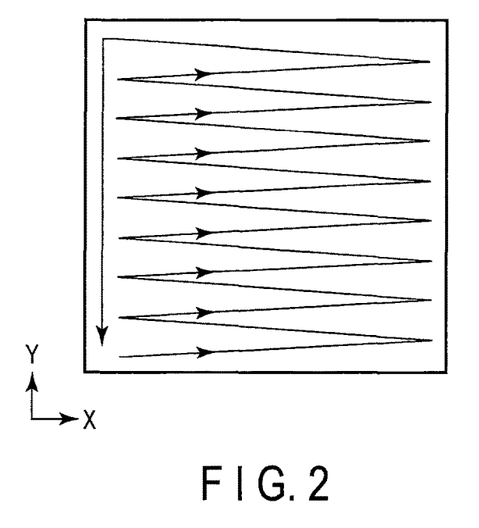
FIG. 2 shows a locus of relative raster scanning of a probe with respect to a sample.

FIG. 2 shows the locus of the relative raster scanning of the probe 101 with respect to the sample 103. The locus of the raster scanning is a conventional and common one. In FIG. 2, the main scanning line direction of the raster scanning (the direction in which the scanning speed is faster) is regarded as the X-direction.

Figure 3:
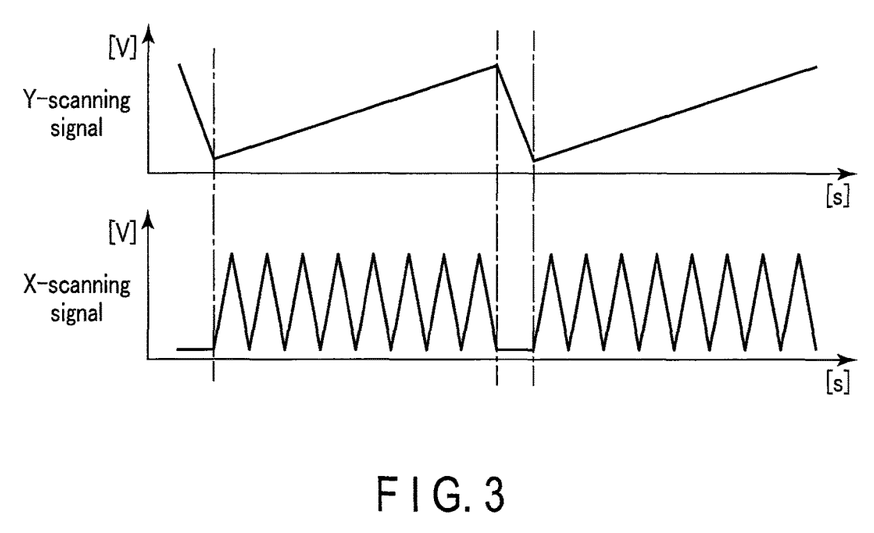
FIG. 3 shows waveforms of an X-scanning signal and a Y-scanning signal for causing an X-scanner and a Y-scanner to perform the raster scanning shown in FIG. 2.

FIG. 3 shows the waveforms of the scanning signals for causing the X-scanner 108a and the Y-scanner 108b to perform the raster scanning shown in FIG. 2. It may be assumed that the X-scanning signal and the Y-scanning signal in FIG. 3 are same as the X-scanning signal and the Y-scanning signal in, for example, the first embodiment, respectively.

Figure 4:
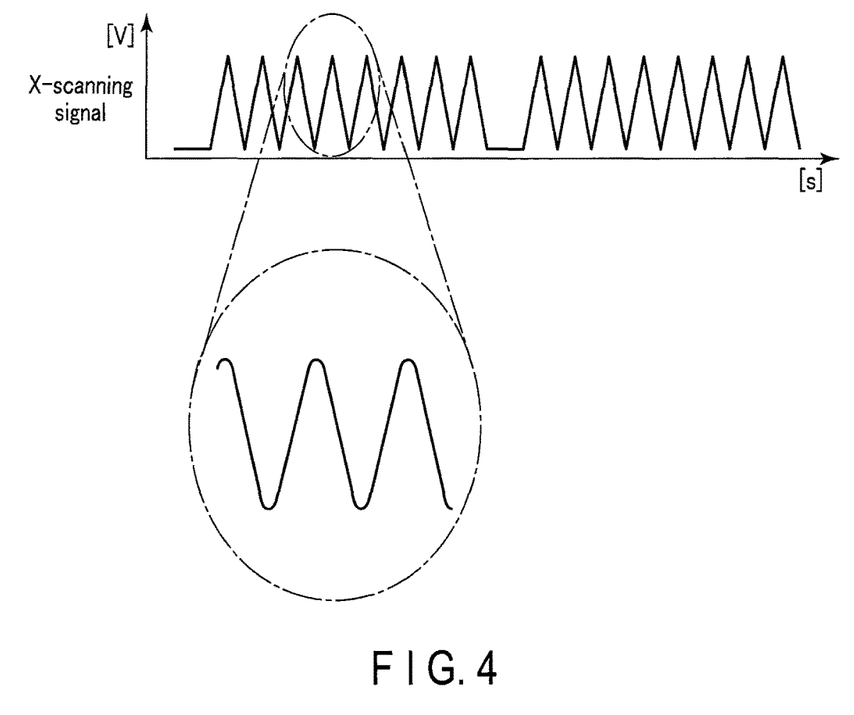
FIG. 4 shows an enlarged part of the X-scanning signal in FIG. 3.

As shown in FIG. 4, the X-scanning signal in FIG. 3 is rounded at portions where the signal changes from an increase to a decrease. This is for reducing harmonic components of the X-scanning signal, leading to an effect of reducing vibration noise attributable to scanning of the X-scanner 108a and the Y-scanner 108b, which are operated by the X-scanning signal and the Y-scanning signal.

Figure 5:
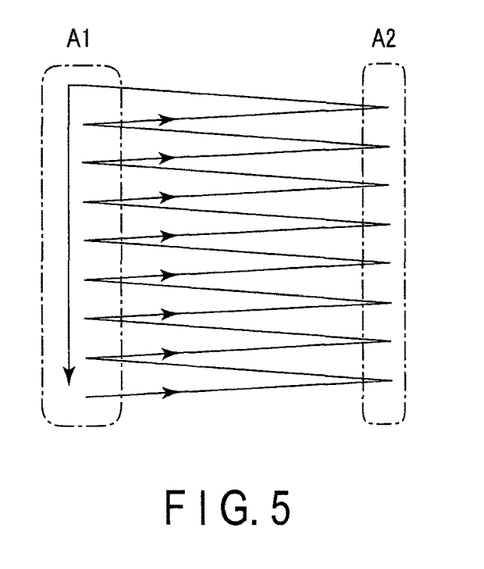
FIG. 5 shows, in addition to the locus of the raster scanning, scanning areas where a relative speed between a probe and a sample decreases.
Figure 6:
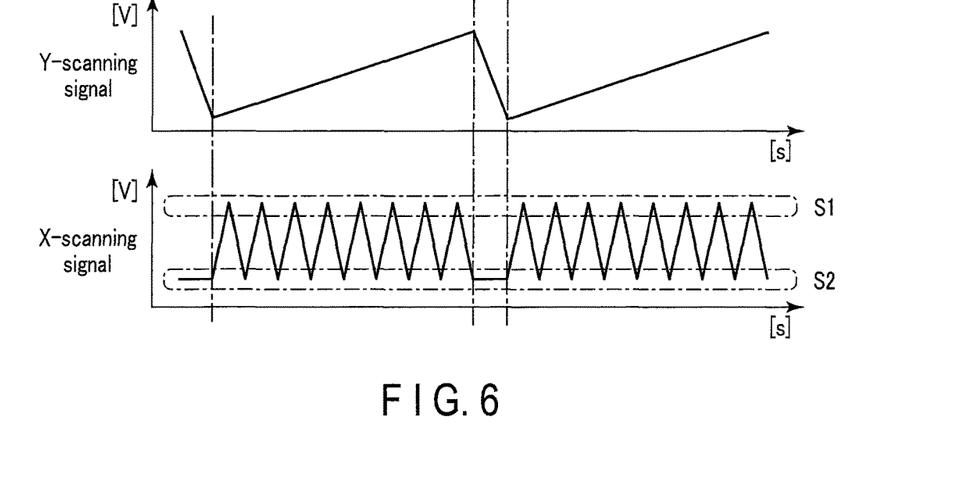
FIG. 6 shows signal regions respectively corresponding to the scanning areas where the relative speed between the probe and the sample decreases, in addition to the waveforms of the scanning signals for the raster scanning.

In the raster scanning, as can be seen from FIGS. 2 and 3, places where the scanning direction is reversed in the X-direction, which is the main scanning line direction, definitely present. Near areas of the places where the scanning-direction is reversed, i.e., in areas near turn-around points (points at which the scanning direction is reversed) including the turn-around points in the X-direction of the raster scanning, the relative speed between the probe 101 and the sample 103 across the XY-plane inevitably decreases. Particularly, in a case where the harmonic components are reduced as shown in FIG. 4, the areas where the relative speed decreases enlarges. FIG. 5 shows, in addition to the locus of the raster scanning, the areas near the turn-around points (the points at which the scanning direction is reversed) including the turn-around points in the X-direction of the raster scanning shown in FIG. 2, i.e., scanning areas A1 and A2 where the relative speed between the probe 101 and the sample 103 across the XY-plane decreases. FIG. 6 shows signal regions S1 and S2 respectively corresponding to the scanning areas A1 and A2, in addition to the waveforms of the scanning signals for the raster scanning.

Figure 7:
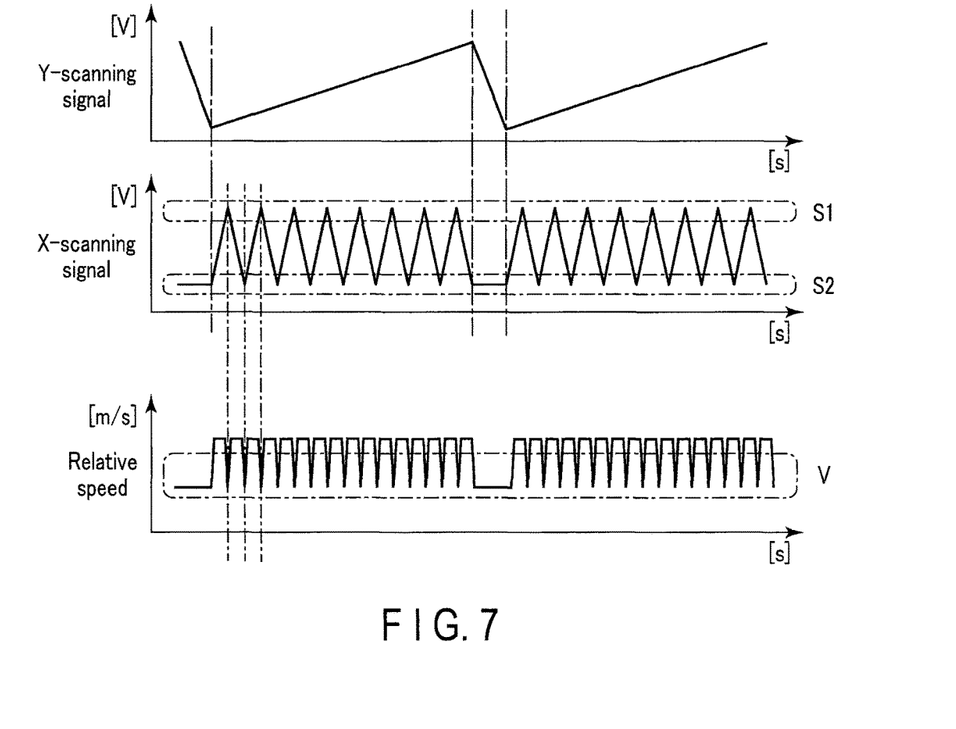
FIG. 7 shows a change in relative speed between the probe and the sample by the raster scanning, in addition to the waveforms of the scanning signals shown FIG. 6.

FIG. 7 shows a change in relative speed between the probe 101 and the sample 103 by the raster scanning, in addition to the waveforms of the scanning signals shown in FIG. 6. The signal regions S1 and S2 correspond to a region V in the graph of the relative speed.

As can be seen from the above, the problem attributable to the raster scanning is that in the areas near the turn-around points (the points at which the scanning direction is reversed) including the turn-around points in the X-direction of the raster scanning, the relative speed inevitably decreases, so that deformation of the sample becomes large. If the deformation of the sample in the areas (the scanning areas A1 and A2 in FIG. 5) near the turn-around points (the points at which the scanning direction is reversed) in the X-direction becomes large, the vertical cross-sectional shape of an observed image of the sample appears like a flipped frying pan. That is, the vertical cross-sectional shape of the observed image of the sample reflects the height of the sample faithfully, except for both end portions thereof, however; at the both end portions, distortions are large, so that the height nearer the end portions is lower than the actual height of the sample.

This is a very significant problem in soft matter observation AFMs to observe soft samples such as a gel.

A second embodiment is to solve this problem, and the second embodiment will be explained below, using FIGS. 8 to 10.

Figure 8:
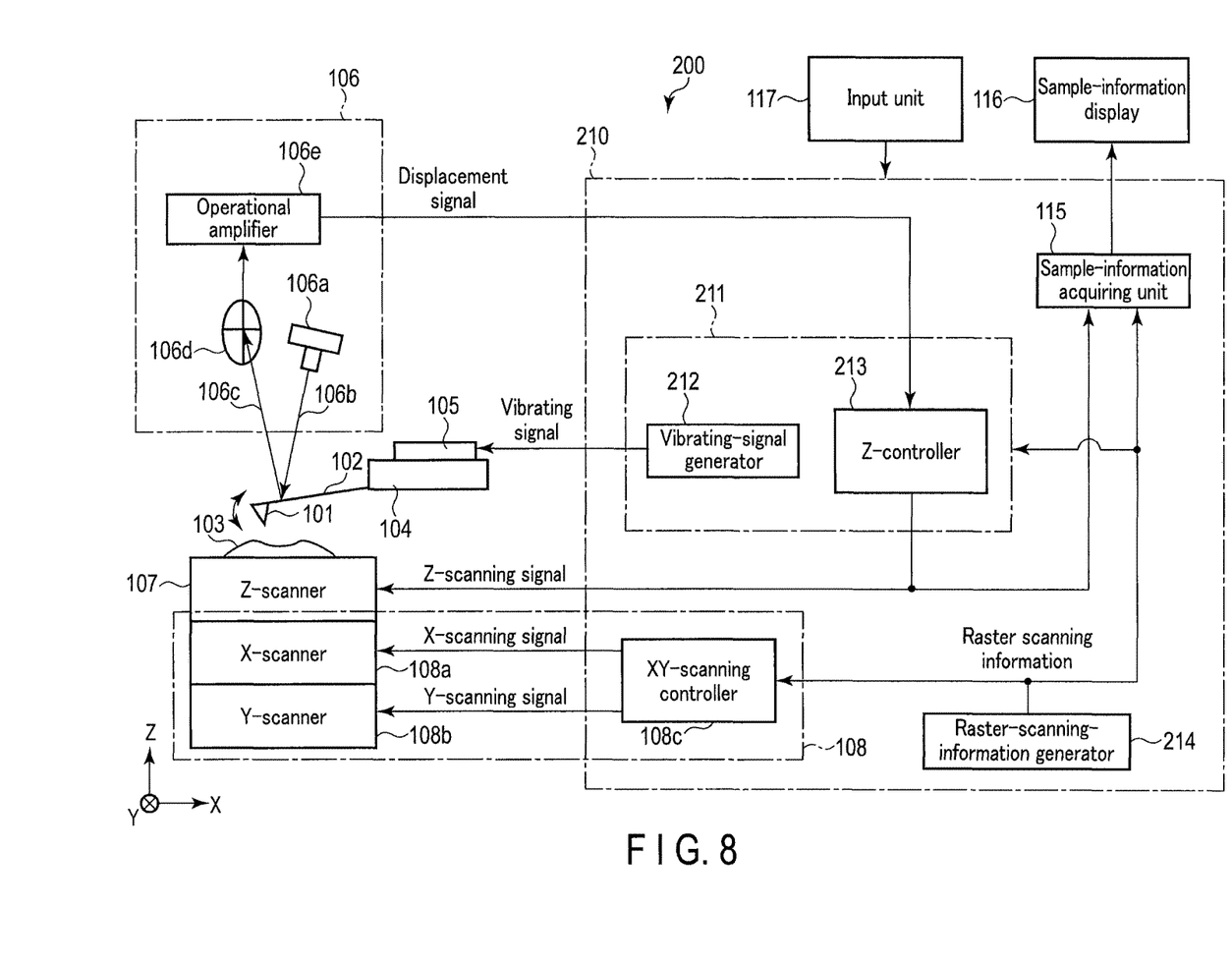
FIG. 8 shows an atomic force microscope of a second embodiment.

FIG. 8 shows an atomic force microscope 200 of the present embodiment. In FIG. 8, members provided with the same reference signs as those of the members shown in FIG. 1 represent the same members, and explanations thereof are omitted herein. The atomic force microscope 200 of the present embodiment differs from the atomic force microscope 100 of the first embodiment shown in FIG. 1, in a controller 210, and in an interaction controller 211 and a raster-scanning-information generator 214, included therein.

The raster-scanning-information generator 214 generates raster scanning information necessary for desired raster scanning. The raster scanning information is supplied to the XY-scanning controller 108c, the interaction controller 211, and the sample-information acquiring unit 115. The raster scanning information includes timing information that indicates the areas where the relative speed between the cantilever 102 and the sample 103 along the X-direction relatively decreases and are synchronized with the scanning in the X-direction of the raster scanning.

Figure 9:
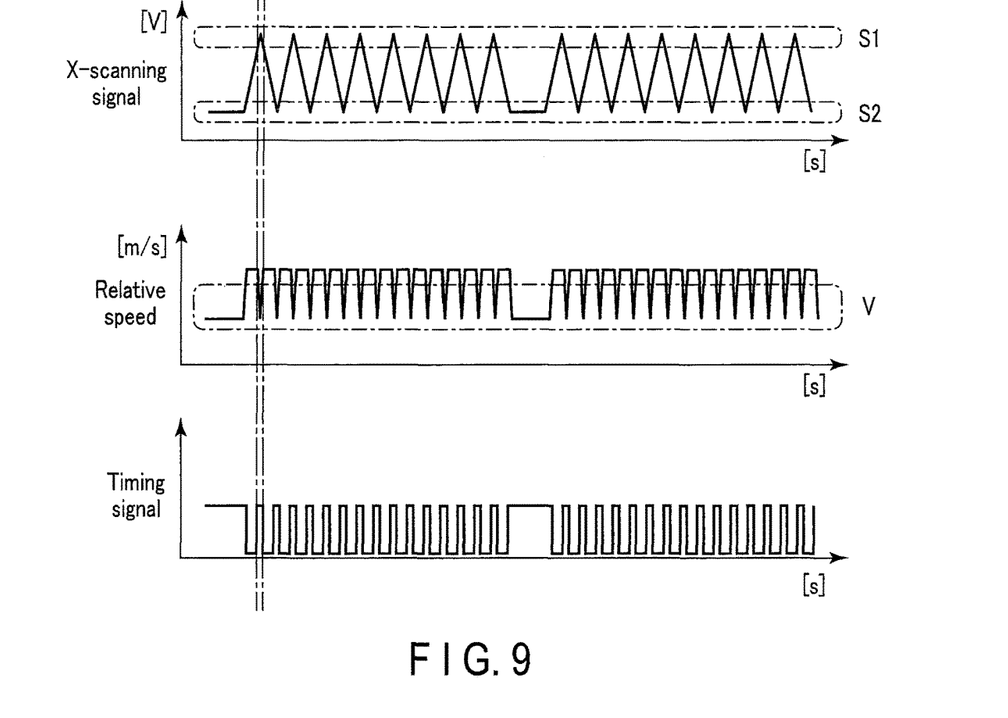
FIG. 9 shows a waveform of a timing signal reflecting a change of the relative speed, in addition to the waveform of the X-scanning signal and the change in the relative speed shown in FIG. 7.

FIG. 9 shows a waveform of a timing signal, in addition to the waveform of the X-scanning signal and the change in relative speed shown in FIG. 7. The timing signal shown in FIG. 9 has a pulse that rises when the relative speed between the probe 101 and the sample 103 across the XY-plane decreases, for example, the relative speed enters a region V, in other words, when the relative speed decreases lower than a predetermined threshold, and falls when the relative speed between the probe 101 and the sample 103 across the XY-plane returns, for example, when the relative speed goes out of the region V, in other words, when the relative speed increases higher than the predetermined threshold. The width of the pulse points to areas where the relative speed decreases, the areas respectively including right and left turn-around points in the entire area of the raster scanning, which are less than 10% (the scanning areas A1 and A2 in FIG. 5 are less than 10%, respectively).

The interaction controller 211 comprises a vibrating-signal generator 212 and a Z-controller 213. Accordingly, the piezoelectric element 105 is controlled by the interaction controller 211 comprising the vibrating-signal generator 212. That is, the interaction controller 211 can control the vibration of the cantilever 102. The Z-scanner 107 is controlled by the interaction controller 211 comprising the Z-controller 213. That is, the interaction controller 211 can control the relative distance between the cantilever 102 and the sample 103 along the Z-direction.

The interaction controller 211 changes, for example, the amplitude of the vibration of the cantilever 102 or the relative distance between the cantilever 102 and the sample 103 along the Z-direction, based on the timing information included in the raster scanning information, for example, the timing signal shown in FIG. 9.

For example, if the amplitude of the oscillation of the cantilever 102 changes, or the relative distance between the cantilever 102 and the sample 103 along the Z-direction changes, the strength of a mechanical interaction between the probe 101 and the sample 103 relatively changes. Specifically, if the amplitude of the oscillation of the cantilever 102 increases, the strength of the mechanical interaction between the probe 101 and the sample 103 relatively increases, and if the amplitude of the oscillation of the cantilever 102 decreases, the strength of the mechanical interaction between the probe 101 and the sample 103 relatively decreases. If the relative distance between the cantilever 102 and the sample 103 along the Z-direction increases, the strength of the mechanical interaction between the probe 101 and the sample 103 relatively decreases, and if the relative distance between the cantilever 102 and the sample 103 along the Z-direction decreases, the strength of the mechanical interaction between the probe 101 and the sample 103 relatively increases.

The interaction controller 211 relatively decreases the strength of the mechanical interaction between the probe 101 and the sample 103 based on the timing information included in the raster scanning information, for example, by reducing the amplitude of vibration of the cantilever 102, or increasing the relative distance between the cantilever 102 and the sample 103 in the Z-direction, for example, during which the pulse of the timing signal shown in FIG. 9 is output, in other words, during which the relative speed is lower than the predetermined threshold.

As described above, the interaction controller 211 can control the strength of the mechanical interaction between the probe 101 and the sample 103 based on the timing information included in the raster scanning information. Specifically, the interaction controller 211 relatively decreases the strength of the mechanical interaction between the probe 101 and the sample 103, during which the timing information included in the raster scanning information, for example, the pulse of the timing signal shown in FIG. 9, is output. In other words, the interaction controller 211 relatively decreases the strength of the interaction in synchronization with the scanning in the X-direction, during which the probe 101 is positioned in a relative-speed-reducing area where the relative speed between the cantilever 102 and the sample 103 in the main scanning direction, i.e., in the scanning in the X-direction relatively decreases.

With the above configuration, in the atomic force microscope according to the present embodiment, when the relative speed between the cantilever 102 and the sample 103 across the XY-plane relatively decreases, the strength of the mechanical interaction between the probe 101 and the sample 103 is relatively decreased by the interaction controller 211, based on the timing information included in the raster scanning information.

Therefore, according to the atomic force microscope of the second embodiment, the problem that the deformation amount of a sample increases when the relative speed decreases in areas near the turn-around points (the points where the scanning direction is reversed) including the turn-around points in the X-direction of the raster scanning is avoided. As a result, deformation of soft samples such as a gel is reduced.

Figure 10:
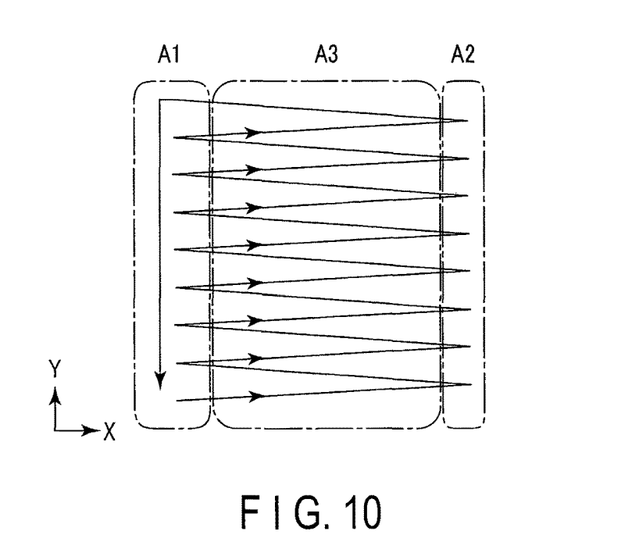
FIG. 10 shows scanning areas where the relative speed between the cantilever and the sample decreases, and an area in which the scanning areas are excluded from the overall scanning area.

In the atomic force microscope according to the second embodiment, only sample information in an area where "scanning areas A1 and A2 where the relative speed between the cantilever and the sample across the XY-plane decreases" shown in FIG. 5 is removed, i.e., in an area A3 shown in FIG. 10 may be displayed on the sample-information display 116. That is, the sample-information acquiring unit 115 may generate image data of sample information in the area A3 in which the areas A1 and A2 where the relative speed between the cantilever and the sample decreases are removed from the entire scanning area, to display it on the sample-information display 116.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An atomic force microscope to acquire sample information by a raster scanning of a cantilever with respect to a sample in combination of scanning in Y-direction and scanning in X-direction faster than the scanning in Y-direction, the atomic force microscope comprising:
    a raster-scanning-information generator to generate raster scanning information including timing information synchronized with the scanning in the X-direction, the timing information including a first timing at which a relative speed between the cantilever and the sample decreases lower than a predetermined threshold, and a second timing at which the relative speed increases higher than the predetermined threshold after the first timing;
    a raster-scanning controller to control the raster scanning based on the raster scanning information; and
    an interaction controller to, based on the timing information, relatively decrease the strength of an interaction between a probe provided at a free end of the cantilever and the sample at the first timing, and relatively increase the strength of the interaction at the second timing.

2. The atomic force microscope according to claim 1, wherein the raster scanning information at least includes scanning stop information related to a stop of the raster scanning, the raster-scanning controller stops the raster scanning based on the scanning stop information, and the raster-scanning controller relatively decreases the strength of the interaction based on the scanning stop information.

3. The atomic force microscope according to claim 1, wherein the relative speed increases higher than the predetermined threshold at the second timing, at which the scanning is performed in a reverse direction with respect to a direction of the scanning at the first timing.

4. The atomic force microscope according to claim 3, wherein the probe is positioned in a relative-speed-decreasing area in which the relative speed is relatively lowered during the period from the first timing to the second timing, the relative-speed-decreasing area includes a turn-around point in the X-direction of the raster scanning (a point at which a direction of the scanning is reversed).

5. The atomic force microscope according to claim 4, comprising a sample-information acquiring unit to generate image data of sample information in an area where the relative-speed-decreasing area is removed from an entire scanning area, and a sample-information display to display the image data generated by the sample-information acquiring unit.

6. The atomic force microscope according to claim 1, comprising a Z-scanner to relatively scan the cantilever and the sample along a Z-direction perpendicular to the XY-plane, the Z-scanner being controlled by the interaction controller, wherein the interaction controller relatively decreases the strength of the interaction by increasing a relative distance between the cantilever and the sample in the Z-direction.

7. The atomic force microscope according to claim 1, comprising a vibrator to vibrate the cantilever, the vibrator being controlled by the interaction controller, wherein the interaction controller relatively decreases the strength of the interaction by decreasing a vibration amplitude of the cantilever.

8. A method of controlling an atomic force microscope to acquire sample information by a raster scanning of a cantilever with respect to a sample in combination of scanning in Y-direction and scanning in X-direction faster than the scanning in Y-direction, the method comprising relatively reducing the strength of an interaction between a probe provided at a free end of the cantilever and the sample at a first timing synchronized with the scanning in the X-direction at which a relative speed between the cantilever and the sample decreases lower than a predetermined threshold, and relatively increasing the strength of the interaction at a second timing synchronized with the scanning in the X-direction at which the relative speed increases higher than the predetermined threshold after the first timing.

9. The method according to claim 8, wherein the first timing is a timing at which the relative speed between the cantilever and the sample becomes almost zero.

10. The method according to claim 8, wherein the relative speed increases higher than the predetermined threshold at the second timing, at which the scanning is performed in a reverse direction with respect to a direction of the scanning at the first timing.

11. The method according to claim 10, wherein the probe is positioned in a relative-speed-decreasing area in which the relative speed is relatively lowered during the period from the first timing to the second timing, the relative-speed-decreasing area includes a turn-around point of the raster scanning in the X-direction (a point at which a direction of the scanning is reversed).

12. The method according to claim 11, further comprising displaying sample information in an area where the relative-speed-decreasing area is removed from an entire scanning area.

* * * * *